United States Patent
Bregler et al.

(10) Patent No.: US 6,888,549 B2
(45) Date of Patent: May 3, 2005

(54) METHOD, APPARATUS AND COMPUTER PROGRAM FOR CAPTURING MOTION OF A CARTOON AND RETARGETTING THE MOTION TO ANOTHER OBJECT

(75) Inventors: Christopher Bregler, San Francisco, CA (US); Lorie Loeb, Burlingame, CA (US)

(73) Assignee: Stanford University, Palo Alto, CA (US)

(*) Notice: Subject to any disclaimer, the term of this patent is extended or adjusted under 35 U.S.C. 154(b) by 157 days.

(21) Appl. No.: 10/101,698

(22) Filed: Mar. 21, 2002

(65) Prior Publication Data

US 2003/0164829 A1 Sep. 4, 2003

Related U.S. Application Data

(60) Provisional application No. 60/277,889, filed on Mar. 21, 2001.

(51) Int. Cl.[7] ............................................. G06T 15/70
(52) U.S. Cl. ..................... 345/474; 345/475; 345/421
(58) Field of Search ................................ 345/473, 474, 345/475, 421

(56) References Cited

U.S. PATENT DOCUMENTS 5,689,437 A * 11/1997 Nakagawa .................. 345/421
6,606,095 B1 * 8/2003 Lengyel et al. ............. 345/473

OTHER PUBLICATIONS

Gleicher, "Retargeting Motion to New Characters", ACM, Jul. 1999.10 pages.*

C. Bregler, et al, "Turning to the Masters: Motion Capturing Cartoons" Category Research, Online Submission ID: 153, Standford University, pp. 1–9.

* cited by examiner

Primary Examiner—Kimbinh T. Nguyen
(74) Attorney, Agent, or Firm—Antonelli, Terry, Stout & Kraus, LLP

(57) ABSTRACT

A method, apparatus and computer program for capturing the motion of a first moving object in a cartoon and retargeting this motion onto the motion of a second moving object. In the invention a digitized video of a cartoon having the first moving object is input and a user is permitted to select from the digitized video a plurality of key shapes of the first moving object as the first moving moves in the digitized video. The motion of the first moving object is captured as motion parameter data by performing a transform of the motion of the first moving object according to each of the key shapes. Thereafter, the motion of the first moving object is retargeted to the second moving object by mapping the motion parameter data onto the second moving object.

24 Claims, 16 Drawing Sheets

METHOD, APPARATUS AND COMPUTER PROGRAM FOR CAPTURING MOTION OF A CARTOON AND RETARGETTING THE MOTION TO ANOTHER OBJECT

CROSS REFERENCE TO RELATED APPLICATIONS

The present application hereby claims the benefit of priority of Provisional Application Ser. No. 60/277,889 filed Mar. 21, 2001, entitled "CARTOON CAPTURE AND RETARGETING", by C. Bregler, et al.

BACKGROUND OF THE INVENTION

The present invention relates to computer animation. More particularly, the present invention relates to a method, apparatus and computer program for transferring motion behavior from traditionally animated cartoons to other digital characters and media.

Animation can be thought of as having two dimensions: the visual style (how the image looks, how it is rendered, the style of the drawing or model) and the motion style (how the characters move, the amount of exaggeration, use of cartoon physics and way in which the animation principles are used). The visual style of an animation can be anything from photo-realistic to abstract. The motion style also varies from one animation to another. It can range from robotic, to realistic to highly expressive.

Physical simulation and motion capture have been fairly effective for creating realistic motion. Physical simulation techniques are mainly used to create low-level physical phenomena and motion capture is used to create realistic human motions.

Physical simulation is a technique for replicating physical phenomena on a laboratory scale in such a way that the resultant data can be used for creating animated motion. Motion capture is a technique for creating animated motion by recording the motion of a live human or animal. The resultant data from physical simulation and the recorded data from motion capture are fit with a three-dimensional kinematics model, and the model is used to drive the behavior of a cartoon character. A key problem with both physical simulation and motion capture is that the derived behavior is typically not nearly as expressive as motion created by highly skilled traditional animators. Thus, the resulting characters appear lifeless and robotic.

Traditional animation is created by highly trained animators who use animation principles to create motion that is expressive and stylized. Often this motion includes exaggeration, cartoon physics and extra degrees of freedom in joint motion. However, stylized and expressive animation, as done by traditional animators, can be time consuming or even impossible. Skilled artists are rare and the costs for employing such individuals are often prohibitive. Further, at present traditionally drawn animations cannot be easily re-used or transferred to different domains and characters.

Therefore, a need exists for generating highly stylized and expressive animation of the level produced by traditional animators. Further, a need exists for easily re-using or transferring motion previously developed for a cartoon to different domains and other characters.

SUMMARY OF THE INVENTION

The present invention provides a method, apparatus and computer program for capturing the motion of a moving object in a cartoon and transferring this motion onto another moving object.

According to the present invention motion of a first moving object in a cartoon is captured and retargeted to the motion of a second moving object such that a characteristic of the motion of the first moving object is imparted to the motion of the second moving object. The present invention accomplishes this by inputting a digitized video of a cartoon having the first moving object and permitting a user to select from the digitized video a plurality of key shapes of the first moving object as the first moving moves in the digitized video. The motion of the first moving object is captured as motion parameter data by performing a transform of the motion of the first moving object according to each of the key shapes. Thereafter, the motion of the first moving object can be retargeted to the second moving object by mapping the motion parameter data onto the second moving object. The second moving object having this retargeted motion will move according to the characteristics of the motion of the first moving object.

The motion parameter data also includes timing parameter data. By maintaining both timing and motion parameters from the original animation, most of the "essence" of the expressive movement can be maintained. Thus, the second moving object retains the timing and personality of the first moving object but with a completely different look.

BRIEF DESCRIPTION OF THE DRAWINGS

The scope of the present invention will be apparent from the following detailed description, when taken in conjunction with the accompanying drawings, and such detailed description and specific examples, while indicating example embodiments of the invention, are given by way of illustration only, since various changes and modifications within the spirit and scope of the invention will become apparent to those skilled in the art from this detailed description in which.

DETAILED DESCRIPTION OF THE INVENTION

The method, apparatus and computer program of the present invention for capturing the motion of a moving object in a cartoon and transferring or retargeting this motion onto another moving object are illustrated in FIGS. 1–16. It should be noted that the embodiments forming the present invention as illustrated in FIGS. 1–16 are each merely representative of numerous embodiments which fall within the scope of the claimed invention. Thus, the present invention is not limited in any way to the embodiments illustrated in FIGS. 1–16.

1. Cartoon Motion Capture and Retargeting

Figure 1:
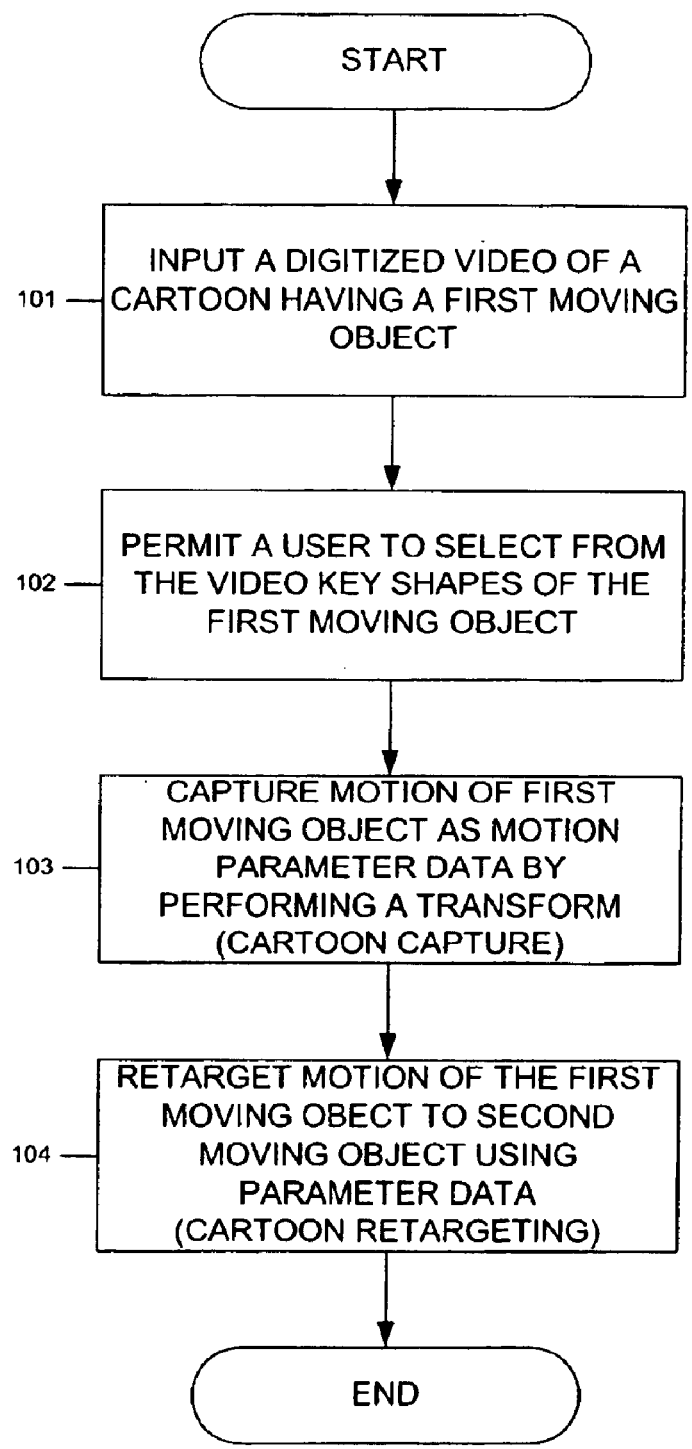
FIG. 1 is schematic diagram illustrating the steps of cartoon motion capturing and cartoon motion retargeting according to the present invention.
Figure 2:
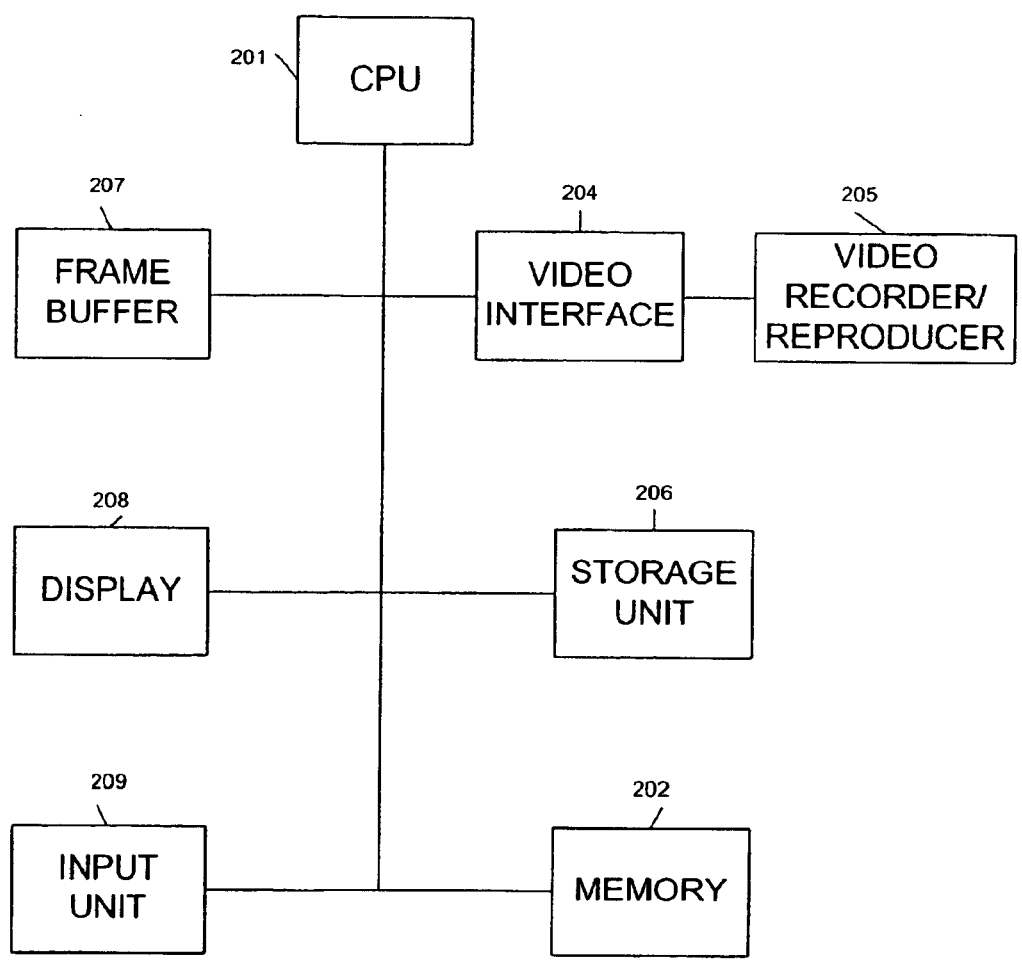
FIG. 2 is a schematic diagram illustrating an information processing apparatus which executes the cartoon motion capturing and cartoon motion retargeting according to the present invention.

The method of the present invention for capturing the motion of a moving object in a cartoon and transferring or retargeting this motion onto another moving object can be implement on any information processing apparatus (e.g. computer, workstation) having basic elements such as that illustrated in FIG. 2. The capturing of the motion of a moving object in a cartoon and the transferring or retargeting of this motion onto another moving object can be performed by the information processing apparatus executing a computer program having code or code sections corresponding the steps of the present invention as described herein and as illustrated in FIGS. 1 and 3.

As illustrated in FIG. 2 the information processing apparatus includes a central processing unit (CPU) 201 for variously controlling each element of the apparatus and executing the process of capturing the motion of a moving object in a cartoon and transferring or retargeting this motion onto another moving object according to a computer stored for example in storage unit 206 and/or memory 202. A display 208 is provided for displaying control information from CPU 201 and information concerning the process of capturing the motion of a moving object in a cartoon and transferring or retargeting this motion onto another moving object. An input unit 209 such as mouse and keyboard is provided for selecting information indicated on the display 208 and supplying commands to CPU 201. A frame buffer memory 207 is provided for storing image information displayed on the display 208 and an image recorder/reproducer (e.g. a video cassette recorder/player, CD player, DVD player) 205 is provided for reproducing from a recording medium (e.g. Tape, CD, DVD) a digitized video signal of a cartoon having a moving object. A video interface 204 is provided for converting the digitized video signal from the image recorder/reproducer 205 into image information of the format to be treated in the information processing apparatus.

Data produced as a result of the process of capturing the motion of a moving object in a cartoon can for example be stored in storage unit 206 and/or memory 202. Information of the other moving object to which the captured motion is to be transferred or retargeted can also be stored in storage unit 206 and/or memory 202. Data resulting from the transferring or retargeting of the captured motion onto the other moving object can be stored in the storage unit 206 and/or memory 202, or recorded on the recording medium by the image recorder/reproducer 205. The user can confirm that the other moving object behaves according to the characteristics of motion of the moving object by displaying the motion of the other moving object on the display 208 after the captured motion has been transferred or retargeted onto the other moving object.

Figure 3:
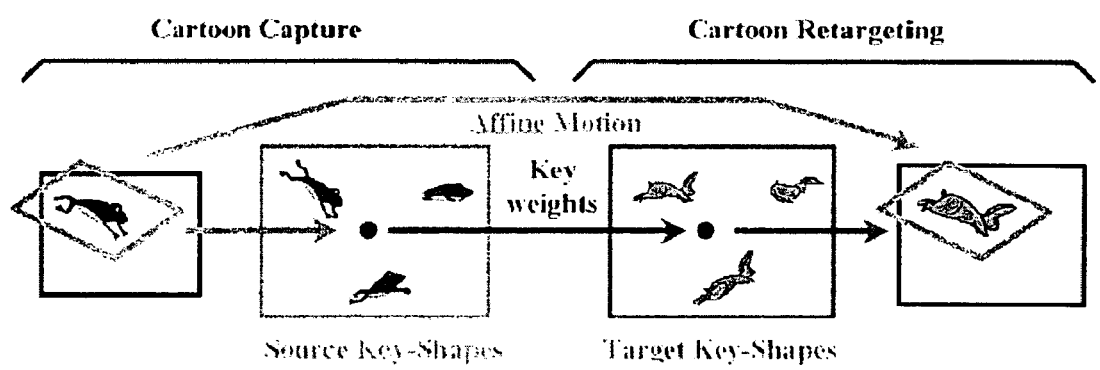
FIG. 3. is a schematic diagram graphically illustrating the steps of cartoon motion capturing and cartoon motion retargeting method according to the present invention.
Figure 4:
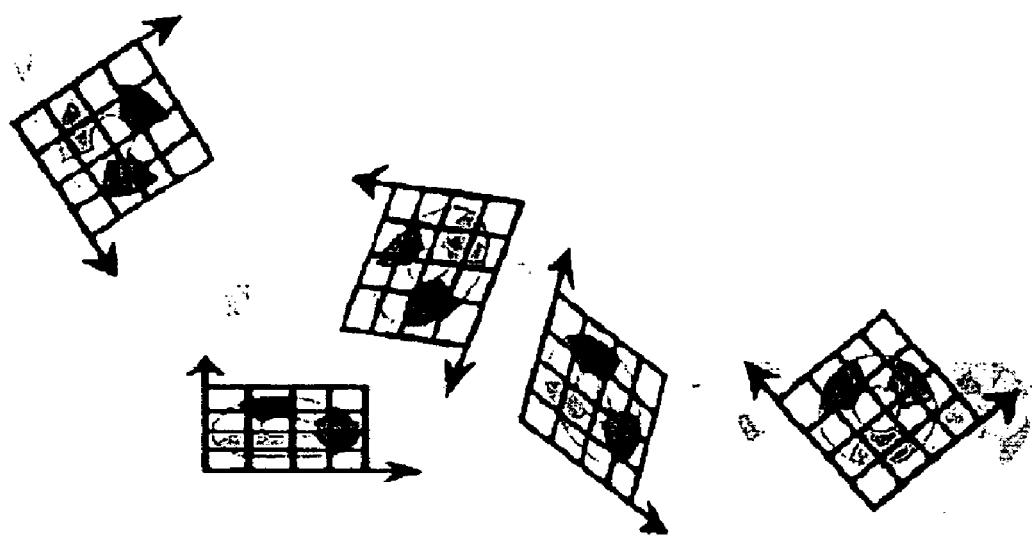
FIG. 4. is a schematic diagram graphically illustrating the motion of a bouncing ball encoded in terms of six affine parameters according to the present invention.
Figure 5:
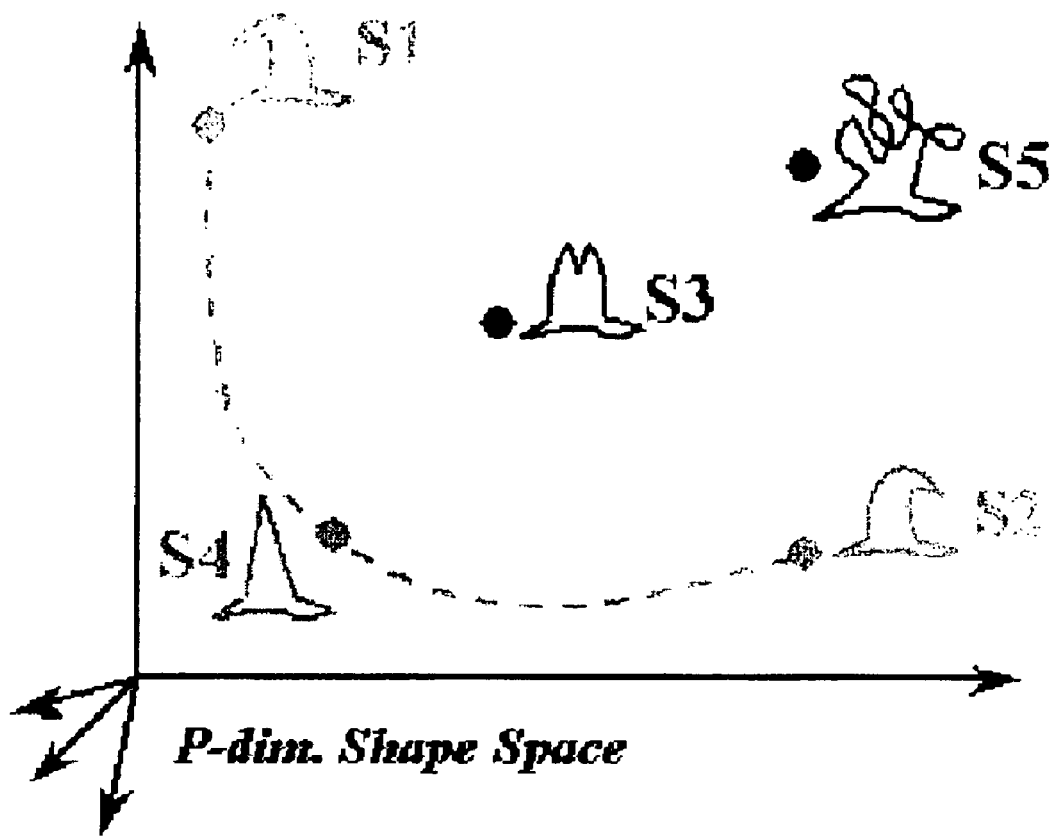
FIG. 5. is a schematic diagram graphically illustrating the multi-dimensional warping space according to the present invention.

The method of the present invention of capturing the motion of a moving object in a cartoon and transferring or retargeting this motion onto another moving object is illustrated in FIGS. 1 and 3. It should be noted that the method illustrated in FIGS. 1 and 3 can be implemented by the information processing apparatus illustrated in FIG. 2 executing a computer program, wherein each of the steps of the method illustrated in FIGS. 1 and 3 correspond to one or more instructions (code or code sections) of the computer program.

Generally according to the method of the present invention illustrated in FIGS. 1 and 3 motion of a first moving object in a cartoon is captured and retargeted to the motion of a second moving object such that a characteristic of the motion of the first moving object is imparted to the motion of the second moving object. A detailed discussion of each of the steps of the method of the present invention is provided below in sections 1.1 through 1.4. Immediately below however is a general discussion of the method of the present invention so as to aid understanding of the overall operation and features of the present invention.

As illustrated in FIG. 1, the present invention accomplishes the method of the present invention this by inputting a digitized video of a cartoon having the first moving object (Step 101) and permitting a user to select from the digitized video a plurality of key shapes of the first moving object as the first moving moves in the digitized video (Step 102). The motion of the first moving object is captured as motion parameter data by performing a transform of the motion of the first moving object according to each of the key shapes (Cartoon Capture) (Step 103). Thereafter, the motion of the first moving object can be retargeted to the second moving object by mapping the motion parameter data onto the second moving object (Cartoon Retargeting) (Step 104). The second moving object having this retargeted motion will move according to the characteristics of the motion of the first moving object.

The motion parameter data as will be described below also includes timing parameter data representative of the timing of the movements of the first moving object. By maintaining both timing and motion parameters from the original animation, most of the "essence" of the expressive movement can be maintained. Thus, the second moving object retains the timing and personality of the first moving object but with a completely different took.

An overview of some of the details of the Cartoon Capture (Step 103) and the Cartoon Retargeting (Step 104) steps of the present invention is illustrated in FIG. 3. As illustrated in FIG. 3, the input to cartoon capture is digitized video and a user-defined set of key shapes. The user-defined set of key-shapes are chosen from the source sequence. The Cartoon Capture step transforms a digitized cartoon into a cartoon motion representation. The cartoon motion is parameterized with a combination of affine transformation and key-weight vectors. In this way, a wide range of motion and non-rigid shape deformations can be described. For the Cartoon Retarget step, the user has to define for each input key-shape a corresponding output key-shape, or key-image, or 3D key-model. The motion parameters are mapped from the source to the target. As per the above by maintaining the timing and motion parameters from the original animation, most of the "essence" of the expressive movement of the source cartoon can be maintained.

Below is a detailed discussion of the method of capturing the motion of a moving object in a cartoon and transferring or retargeting this motion onto another moving object. This detailed discussion is organized as follows: a discussion of cartoon motion representation is set forth in section 1.1 Modeling Cartoon Motion; a discussion of two cartoon motion capture processes is set forth in sections 1.2 Contour Capture and 1.3 Video Capture; a discussion of cartoon retargeting is set forth in section 1.4 Retargeting Cartoon Motion; and a discussion of examples of cartoon retargeting is set forth in section 2 Examples.

1.1 Modeling Cartoon Motion

Cartoon motion is described as a composition of two types of deformations: (1) Affine deformations, that encode the global translation, rotation, scaling, and sheer factors, and (2) Key-shape deformations, that are defined relative to a set of key-shapes.

1.1.1 Affine Deformations

An important part of cartoon motion comes from the velocity of the entire body, and how it stretches and squashes in different directions. This is demonstrated on the bouncing-ball motion in FIG. 4. The motion style is determined by how fast the ball travels, the arcing (shape of the ball trajectory), how much the ball rotates from frame-to-frame, how much it squashes and stretches, and the timing of the squash and stretch actions of the ball. The motion style is approximated with a sequence of affine motions as illustrated with the overlaid grid in FIG. 4.

The ball shape S is deformed to a shape V(t) at time frame t with affine parameters ?(t)=[$a_1$, $a_2$, $a_3$, $a_4$, $d_x$, $d_y$]:

$$V = warp(\theta, S) = \begin{bmatrix} a_1 & a_2 & d_x \\ a_3 & a_4 & d_y \end{bmatrix} \cdot S \quad (1)$$

The variables $a_1$, $a_2$, $a_3$, and $a_4$ describe rotation, x/y scale, and shear, and dx, dy code the x/y translation. S is a 3×N shape matrix. [$s_1$, ..., $s_N$]coding N points in homogenous form $s_1$=[$x_i$, $y_i$, 1]$^T$. For instance, S could be a set of points along the contours of the ball. If S is replaced with a new contour, for example a donut-shape, or a photograph, but the same affine motions ?(1), ..., ?(t) is applied, the moving shapes V(1), ..., V(t) completely change, but the motion style remains the same.

1.1.2 Key-Shape Deformations

Consider a more complicated motion such as the frog jumping on the left part of FIG. 3. With affine parameters, the coarse motion can be approximated, but several important deformations are missed, such as the extension and contraction of the legs. To cover those deformations, a set of characteristic key-shapes $S_i$ (or blend-shapes) are used. These shapes are picked by the user, and should include all possible extreme deformations. FIG. 3 shows three example key-shapes. The examples show how the frog transforms from a stretched-out shape $S_1$ in the air to a squashed shape $S_2$ in the landing. All in-between shapes can be approximated as multi-way linear interpolations. Thus the motion model extends to:

$$V = warp(\theta, S_1 ... S_k) = \begin{bmatrix} a_1 & a_2 & d_x \\ a_3 & a_4 & d_y \end{bmatrix} \cdot \left( \sum_k w_k \cdot S_k \right) \quad (2)$$

The extended motion vector includes affine and interpolation weights: $\theta$=[$a_1$, $a_2$, $a_3$, $a_4$, dx, dy, $w_1$, ..., $w_k$]. Similar to the ball example and its affine parameterization, many important animation principles on more complex shapes can be described with different timing of the interpolation weights.

In some domains linear interpolation is a good approximation, but in many domains, it produces in-between shapes with undesirable visual artifacts. Restrictions of linear interpolations are demonstrated in FIG. 5. Shape S3 is the linear interpolation (average) of shapes S1 and S2. It is possible to cover those in-between shapes with additional key-shapes. For example adding shape S4 as a new key-shape allows for the approximation of visually meaningful in-between shapes of S1 and S2. Since each additional key-shape puts additional burden on the user for defining the source and the retarget key-shapes, for more complex domains a larger space is automatically generated.

Extended Linear Warping Space:

One possibility is, to replace the linear warping function with a nonlinear function. For instance, a nonlinear warping function has been proposed that avoids many such artifacts. This nonlinear warping function (and many other nonlinear warping techniques) are well defined for interpolation between two key-shapes. Extensions to multi-way warping functions between more than 2 key shapes are non-trivial. For cartoon capture the inverse function need to be computed. For a linear warping case, this is well conditioned, but for functions that are highly nonlinear numerical techniques required that are prone to many local minima and singularities.

If the proposed nonlinear warping function is used as a preprocessing step to enlarge the key-shape set: (1) M in-between shapes can be automatically generated for each pair of hand-picked key-shapes $S_i$, $S_j$. This produces a large set of (K–1)×(K–2)×M shape examples, where K is the number of the original key shapes for densely covering the entire cartoon shape space. (2) a principal components analysis (PCA) can be applied on this large shape database. PCA will generate a mean shape M, and eigen-vectors $E_1$, ..., $E_L$ that span principal shape variations in orthogonal directions of the shape space. Every original example can be approximated with V=M+?$_1$$a_1$. $E_1$. The number of eigen-vectors is determined by the maximum allowed approximation error. If $S_1$ $a_1$, is constrained then the following can be written:

$$V = S_L + 1 \cdot M + \sum_{l=1}^{L} S_l(M + E_l) = \sum_{l=1}^{L+1} S_l \cdot S_l \quad (3)$$

Therefore the extended shape space is computed in selling $S_1$:=M+$E_1$ and $S_L$+l: =M. Usually the number of automatically derived key-shapes is higher than the original hand-picked shapes (to cover the nonlinear in-between shapes), but sometimes it can be lower, when the user has chosen redundant key-shapes.

The extended linear warping space provides the modeling power of more complex nonlinear warping functions, but allows all numerical advantages to be kept, due to the linear basis representation. Furthermore, this technique allows the transform of a function that is only defined for shape pairs into a multi-way warping function of more than two key-shapes. This technique shows its full potential especially for our video-capture process, as will be described below.

1.1.3 Sub-Part Decomposition

Simple characters like the bouncing ball example or the frog deformations can be modeled with global set of affine and key-shape parameterization, but more complicated characters should be split into sub-parts. For example, in articulated figures, the leg deformations can be modeled separately from the arm deformations, and the head deformations. This reduces the number of degrees of freedom.

In the following section three tasks are described that use the Equation (2): (1) Contour capture, that assumes a known contour V and solves for $\theta$, (2) Video capture, that applies Equation (2) directly to the unlabeled video to solve for $\theta$, and (3) Cartoon-retargeting which takes a $\theta$ and different $S_i$ to generate a new shape motion V.

1.1 Contour Capture

The input is a sequence of cartoon contours: $V(1), \ldots, V(t)$ and the hand-labeled key-shapes $S_1, \ldots, S_K$. If the animator used a computer tool, those V vectors can come directly from the tool. Also the vectors can be hand-rotoscoped from stock-footage animation. Given V, the Equation (2) is used to solve for $\theta$.

Since the cartoon motion model will not exactly match the contour input, a motion vector ? that will approximate the contour input is estimated. This can be done while minimizing following error term:

$$Err = \|V - warp(0.S_1 \ldots S_k)\|^2 \quad (4)$$

We minimize this term with a two step procedure. (1) First the affine motion parameters is computed, (2) Then the key-weights on affine aligned shapes is estimated.

Affine Capture:

Estimating affine motion of contours can be done with a closed-form solution. The affine motion is measured while minimizing the following error term:

$$Err_{aff} = \left\|V - \begin{bmatrix} a_1 & a_2 & d_x \\ a_3 & a_4 & d_y \end{bmatrix} \cdot S_1\right\|^2 \quad (5)$$

The standard least-squares solution is:

$$\begin{bmatrix} a_1 & a_2 & d_x \\ a_3 & a_4 & d_y \end{bmatrix} := V \cdot S^T (S \cdot S^T)^{-1} \quad (6)$$

Key Weight Capture:

Now the set of key-weights $w_k$ need to be found while minimizing the following full approximation error:

$$Err = \left\|V - \begin{bmatrix} a_1 & a_2 & d_x \\ a_3 & a_4 & d_y \end{bmatrix} \cdot \sum_k w_k \cdot S_k\right\|^2 \quad (7)$$

Improved results are experienced if additional constraints are placed on the key-weights $w_k$. So far the fact, that the shape space of $S_1, \ldots, S_k$ is much larger than just the visually correct in-between shapes has been ignored. The desire is to avoid the case that noise and other small (un-modeled) variations of V will cause very large positive and negative key-weights $w_i$. This causes severe problems for the retargeting task. Many "illegal" shapes can be generated with large weights. Usually most in-between shapes are generated by using only a few key-shapes (only a few $w_i$ are non-zero, and they sum to 1). Furthermore, the key-shapes work best for interpolation, but only have limited power for extrapolation.

The following constraints are enforced:

Constraint 1: Only J interpolation weights are non-zero. This enforces that each possible shape lies in a smaller (local-linear) J dimensional subspace. Such shapes are closer to the curve in FIG. 5.

Constraint 2: All key-weights add to 1. This approximates an important animation principle, called "preservation of volume". In this case, also the affine matrix A need to constrained to be a rotation matrix, to disallow scale change.

Constraint 3: All weights must lie in a margin [T1–T2]. Usually T1=−0.5 and T2=1.5. This enforces limited extrapolation.

Minimizing the quadratic term of Equation (7) due to the linear equality and inequality constraints can be done with quadratic programming.

Since the affine estimation was done relative to $S_1$ and not to the weighted combination of all key-shapes, iteration need to be performed. Given the key-weights, weights, the weighted interpolation S is computed. The new affine parameters are estimated based on S. Then the key-weights are recomputed based on the new affine adjusted V and iteration is performed until convergence.

1.3 Video-Capture

As in contour-capture, the output of video-capture is a sequence of motion vectors ? that fit the input data. Now the input data is a sequence of images l instead of contours. The cartoon motion model is extended such that it models directly image pixel variations. With this extension the cartoon-motion model can be incorporated into a vision-based region tracking technique. This allows us to track cartoons without contour labels.

Figure 6:
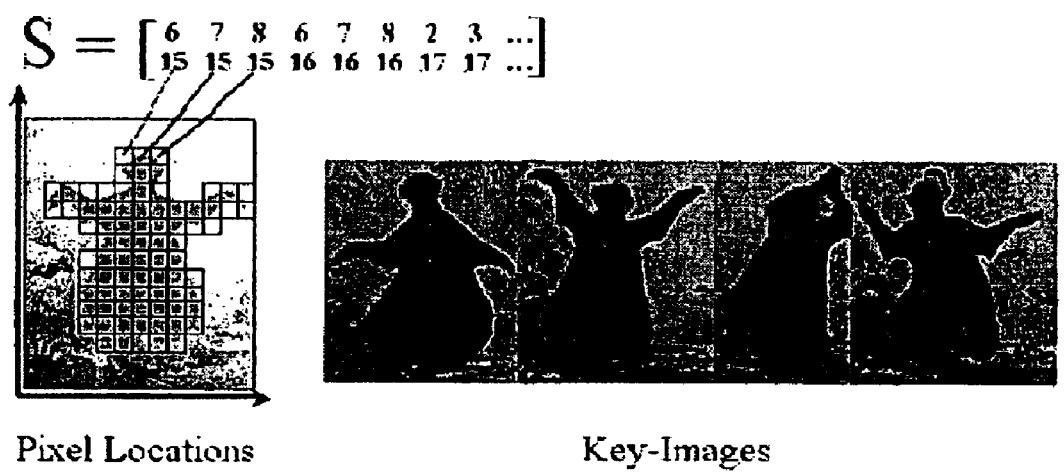
FIG. 6. is a schematic diagram graphically illustrating how the shape vector is used to index all pixel location of a cartoon and four key shape examples according to the present invention.

We use the following notation: $S^{2 \times N} = [s_1, \ldots, s_N]$ contains the x/y coordinates of all N pixels of the cartoon image region as shown in FIG. 6. $I(s_i)$ is the gray level value of an image I at pixel location $s_i$. $I(S)$ denotes the vector of all pixel gray levels in the cartoon region. $I(warp(S, \theta))$ is the warped image using the warp $(S, \theta)$ function. As in contour-capture, the image warp is not exactly matched with the motion model due to noise and inaccuracies of the model. Therefore the following error function is minimized:

$$err_{image} = \|I_t(warp(\theta, S)) - I_0(S)\|^2 \quad (8)$$

This equation states, that if $I_t$ is warped, it should look similar to $I_0$. The error term of Equation (8) is in a sense the previous error term of Equation (7) mapped through the image function I.

Affine Capture:

For affine motion only, equation (8) can be rewriten to:

$$err_{aff} = \sum_{s_i \in S} (I_t(A \cdot s_i + D) - I_x(s_i))^2 \quad (9)$$

In Equation (9) A is the rotation, scale and shear part of the affine parameters, and D is the translation. This error function can be minimized using the well known affine version of the Lucas-Kanade technique (a standard least-squares based technique in the computer vision literature). It is beyond the scope of this invention to explain this technique in full detail, however a brief summary of the estimation is provided by the following:

Linear least-squares estimation can not be directly applied, since $I_t(A?s_i+D)$ is nonlinear. Thus, the following linear approximation of $I_t$ is used:

$$I_t(A \cdot s_i+D) \approx I_t(s_i)+[I_x(s_i) \cdot I_y(s_i)] \cdot (A \cdot s_i+D) \qquad (10)$$

In Equation (10) $?I=[I_x, I_y]$ is the image gradient of $I_t$, in x and y direction. a 2D Gaussian convolution filter is used as to estimate the image gradient in a noise-robust way. Thus, Equation (9) can be rewritten to:

$$err_{aff} \approx \sum_{s_i \in S} (I_t(s_i) + \Delta I(s_i) \cdot (A \cdot s_i + D) - I_0(s_i))^2 \qquad (11)$$

$$= \sum_{s_i \in S} (H_i \cdot \theta_{aff} + z_i)^2$$

$\theta_{aff}=[\alpha_1,\alpha_2,\alpha_3,\alpha_4,d_x,d_y]^T$
$H_i=[I_x(i) \cdot x_i, I_x(i) \cdot y_i, I_y(i) \cdot x_i, I_y(i) \cdot y_i, I_x(i) \cdot I_y(i)]$
$z_i=I_t(i)-I_O(i)$ The standard least-squares solution of this linearized term is:

$$\theta_{aff}=(H^T \cdot H)^{-1} \cdot H^T \cdot Z \qquad (12)$$

$$H = \begin{bmatrix} H_1 \\ \ldots \\ H_N \end{bmatrix} \text{ and } Z = \begin{bmatrix} z_1 \\ \ldots \\ z_N \end{bmatrix} \qquad (13)$$

Since the linear approximation of Equation (10) is used, the optimal motion parameter θ is found in using Equation (11) iteratively in a Newton-Raphson style minimization.

Affine and Key Capture:

If the motion model includes the affine and key-shape deformation model, the estimation framework need to be further extended. The image template $I_O$ is replaced with a combination of L key-images: $S_1 \, w_1 \, E_1$:

$$err_{keys} = \sum_{s_i \in S} \left( H_i \cdot \theta_{aff} + I_t(s_i) - \sum_l w_l \cdot E_k(s_i) \right)^{(2)} \qquad (14)$$

$$= \sum_{s_i \in S} ([H_i \cdot E_1(z) \ldots E_L(z)] \cdot \theta + I_t(z))^2 \qquad (15)$$

The extended vector $\theta=[a_1, a_2, a_3, a_4, d_x, d_y, w_1, \ldots, w_L]^T$ can be estimated with standard least squares estimation as above.

The right side of FIG. 6 shows example key-images for the Balou sequence. Those are the original hand-picked key-shapes. Since the linear interpolation of those hand-picked key-images produce "illegal" shapes (linear interpolating a arm motion merely generates a double image of both arm configuration), it was essential, that an extended basis-set be used as described in section 1.2. Many in-between images are generated from the key-images using the non-linear warping function. Applying PCA to the enlarged dataset, resulted in L "eigen-images" $E_1$.

Figure 7:
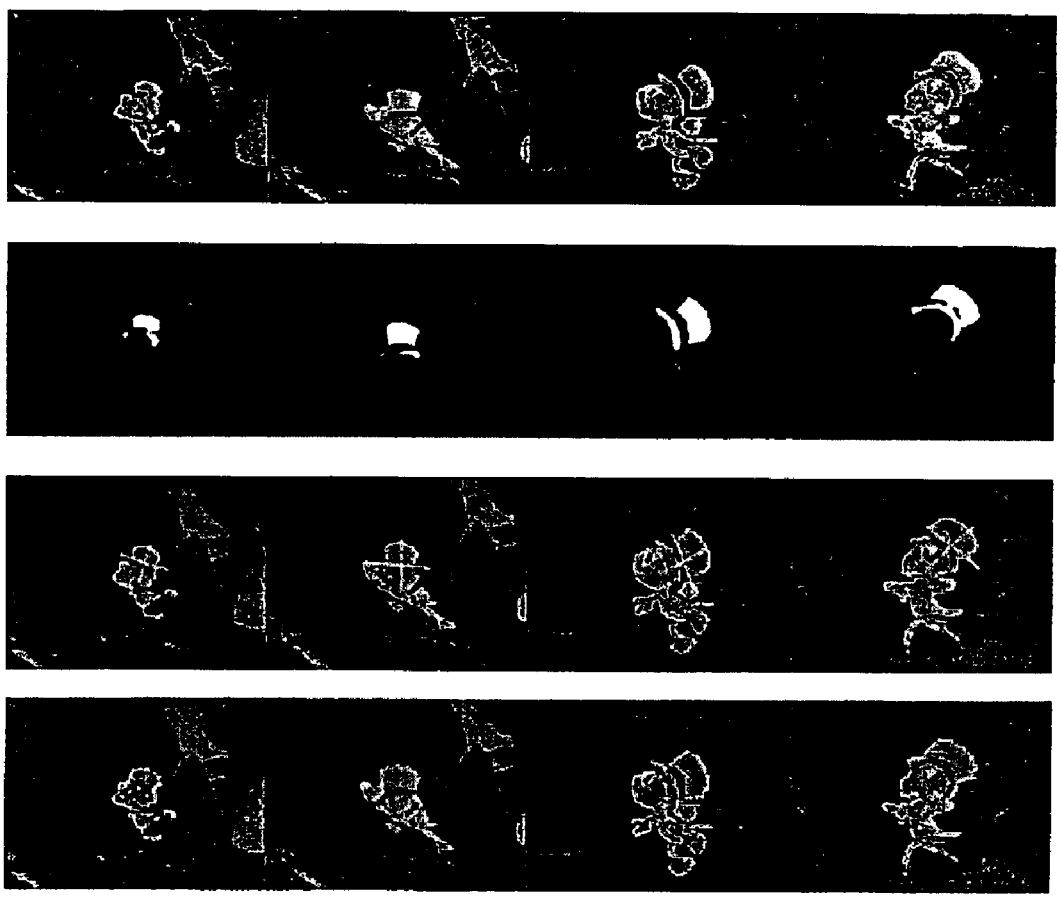
FIG. 7. are pictures illustrating hat color segmentation, affine capture and key-shape shape based tracking of the hat according to the present invention.
Figure 8:
FIG. 8. are pictures illustrating color-clustered layer and the key-shape based tracking of Balou according to the present invention.
Figure 8:
Figure 8:

Sub-Part Layers:

The video-capture process is very sensitive to outliers. Outliers are pixels that are not part of the cartoon region. They could be part of the background, or occluding foreground (including self-occlusion from other cartoon parts). Those pixels are automatically discounted in computing an adaptive alpha matte. Usually, the cartoon region has a specific color range. An alpha-matte can be generated using a probabilistic color segmentation technique. For instance, the hat in FIG. 7 can be segmented automatically. The second row of images in each of FIGS. 7 and 8 illustrate some examples of the generation of an alpha-matte. The video-capture process is then only performed on pixels that are included in this matte. This can be done in reducing the summation to only those pixels as per the following:

$$err_{keys} = \sum_{s_i \in Layer} \left( I_L(A \cdot s_i + D) - \sum_l w_l \cdot E_k(s_i) \right)^2 \qquad (16)$$

1.4 Retargeting Cartoon Motion

Different output media, including 2D cartoon animation, 3D CG models, and photo-realistic output can be produced according to the present invention. For each domain, a model of how a specific input key-shape looks in the output domain is needed. For simple affine deformations, the input template is simply replaced with a template in the output domain. For key-shape models, a design of the corresponding key-shape and the interpolation function in the output domain is needed. The corresponding output shape can look similar or drastically different from the input as long as the key poses are consistent in their meanings. For example, if key pose 1 in the input cartoon is more extreme than key pose 2, then key pose 1 in the output drawing should also be more extreme than key pose 2 in the output drawing.

1.4.1 Designing the output Model and Retargeting

Figure 9:
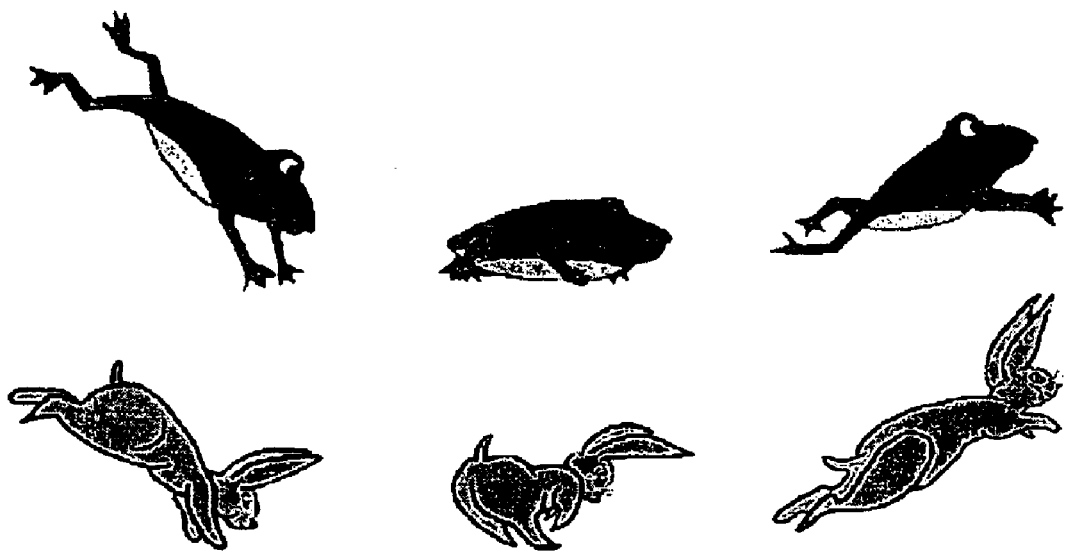
FIG. 9. is a schematic diagram graphically illustrating a 2D example of key shapes for the input cartoon and corresponding output key shapes according to the present invention.
Figure 10:
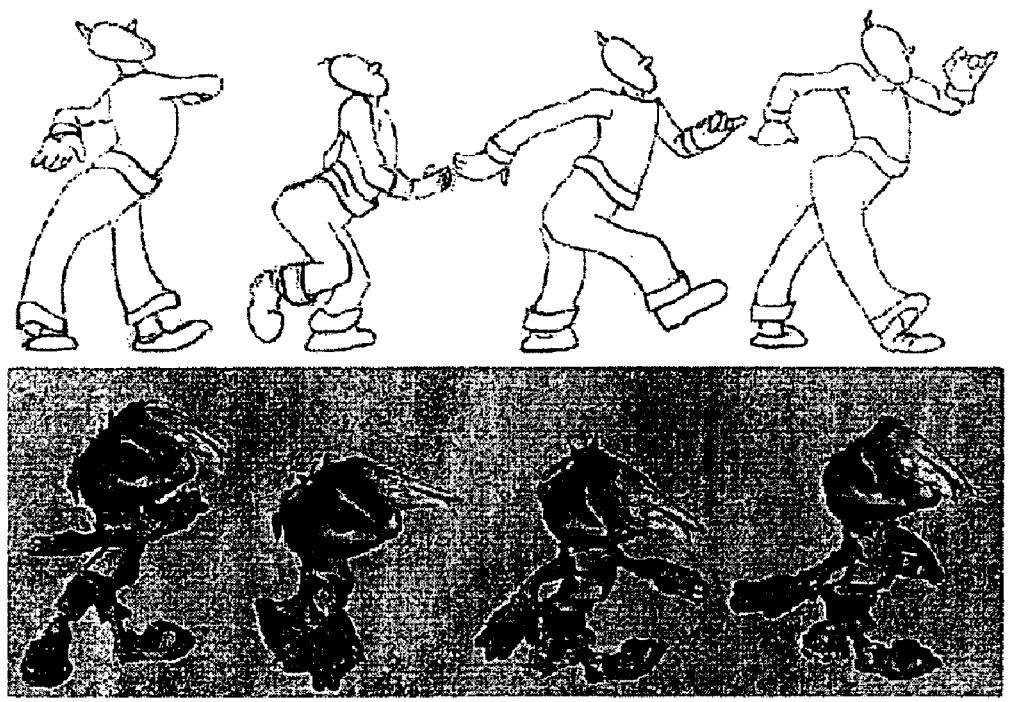
FIG. 10. is a schematic diagram graphically illustrating a 3D example of key shapes for the input cartoon and corresponding output key shapes according to the present invention.

2D Drawing and Photographs:

For each key shape used in the key-shape deformation, a corresponding 2D shape is drawn in the output domain. In addition, the corresponding control points (or contours) between the different output key poses are labeled. FIG. 9 shows the key poses of a frog and the corresponding key poses of a bunny. The retargeting process is as follows: First, the affine motion of each output key pose is extracted with respect to some reference frame using Equation (5). Second then, the chosen interpolation function is applied to the affine adjusted key poses using the weights obtained from the cartoon capture process. Third and finally, the affine motions of the input cartoon are added to the resulting key-shapes to produce the final animation.

3D Models:

To retarget the input motion to 3D models, the animator uses a 3D modeling tool to make the key poses for the output animation. To retarget the affine motion of the input cartoon to a 3D model, the equivalent of affine motion in 3D is needed. For the in-plane motion (image plane), the affine parameters are mapped just as in the 2D case. The out-of-plane motion from the input cartoon is not explicitly recovered. This does not however imply that the models are flat. The 3D information is inferred when the key poses for the output 3D model are designed. For example, as shown in the top row of FIG. 10 it is difficult to measure which direction the character's right foot is pointing at from the input cartoon drawing. The animator, while doing the 3D modeling, interprets the right foot as pointing toward the viewer in the first key frame, as shown in the bottom row of FIG. 10. Since the solution to the equation is such that the weight has to be one for that key pose and zero for the other keys, the retargeted output character naturally points his right foot toward the viewer.

Applying the key shapes deformation to 3D models works the same way as the 2D examples, except now it is possible to use control vertices for the mesh or the nurb, depending on the modeling choice. Linear interpolation is used for all the 3D examples. However, a special case for retargeting to 3D articulated figures is made. Interpolation in the joint angle space is chosen since interpolating in the joint-angle space is analogous to the non-linear shape interpolation function described section 1.1. The 3D joint angles are first taken from the 3D model. The joint angles for the in-between frames are then interpolated using the weights from the capture process. Note that this is different from interpolating each joint angle independently. All the joint angles are interpolated with the same weights from the cartoon capture process and more than two key poses can be used for each output pose.

Additional Constraints and Post-processing:

In many cases, the translation of the original cartoon needs to be modified to satisfy certain constraints in the output domain. This is due to the fact that the affine parameters of the output key poses are factored out and the affine parameters of the input cartoon are applied to the output sequence. Since the output character can have different proportions and dimensionality from the input character, using the same affine motion results in undesirable effects such as the output character's foot going through the ground. In most cases, simple ad-hoc global translations produced a reasonable result. These global translations include constraints that ensure that the foot is at a certain position at a specific time frame.

2. Examples

To demonstrate and test cartoon capture, several examples were created.

Figure 11:
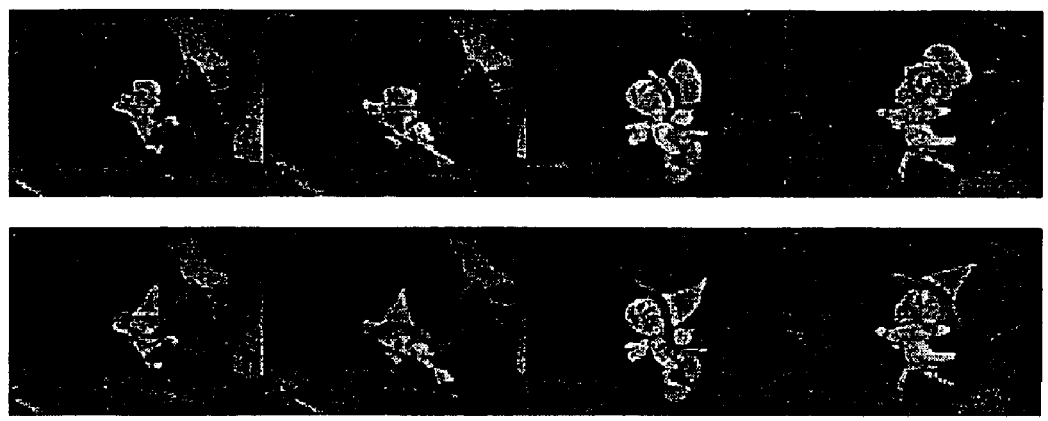
FIG. 11 is a schematic diagram graphically illustrating the hat retargeting sequence according to the present invention.

A first example is provided where the video capture technique described in section 1.3 is used to follow the motion of an animated hat that was then retargeted onto a simple two-dimensional drawing of a different hat. The new hat is refitted onto the original footage. FIG. 11 illustrates a few frames and the video of the entire capture and retargeting of this first example.

Figure 12:
FIG. 12 is a schematic diagram graphically illustrating the tracking of Balou's dance and retargeting to a flower according to the present invention.

A second example is provided where the dance of Balou from The Jungle Book is captured and retargeted to a drawing of a flower. Again, the video capture technique is used to extract the motion parameters and apply them on the output drawing of the flower. FIG. 12 illustrates this example.

Figure 13:
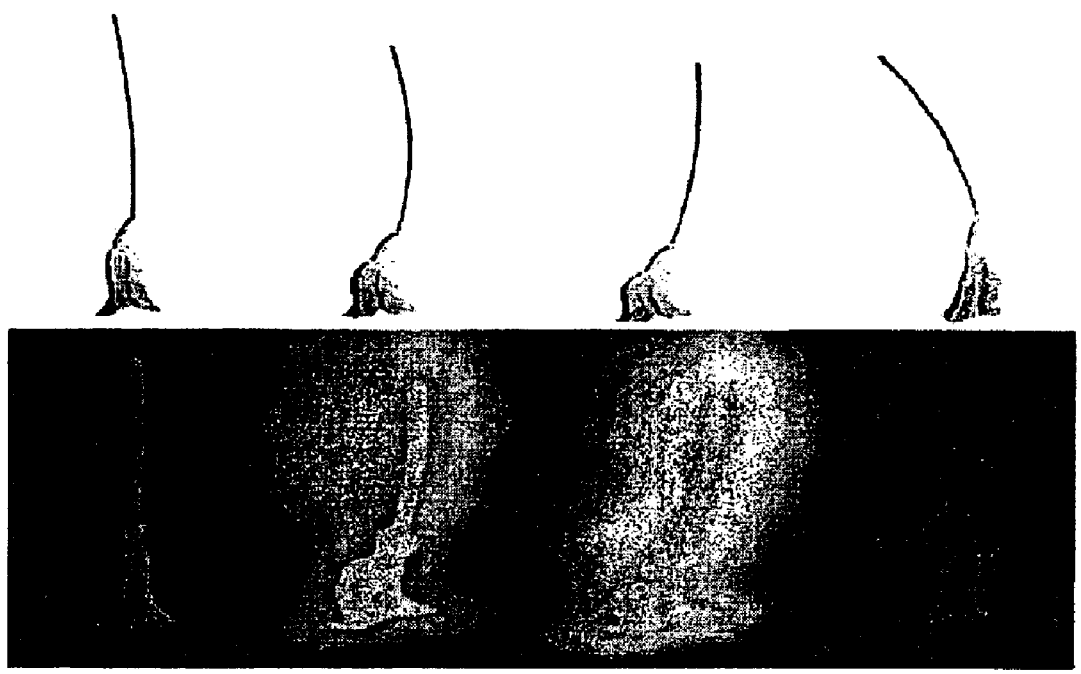
FIG. 13 is a schematic diagram graphically illustrating the broom retargeting sequence according to the present invention.

A third example is provided where the motion of the broom from the Sorcerer's Apprentice sequence of Fantasia is captured and retargeted onto a digitized photo of a broom. Contour capture is used with constraints and retargeting is performed with additional constraints as described in section 1.4, since the broom dimensions are changed. Then the composite of the broom sequence is placed onto a live-action video sequence. FIG. 13 illustrates several retargeted brooms.

Figure 14:
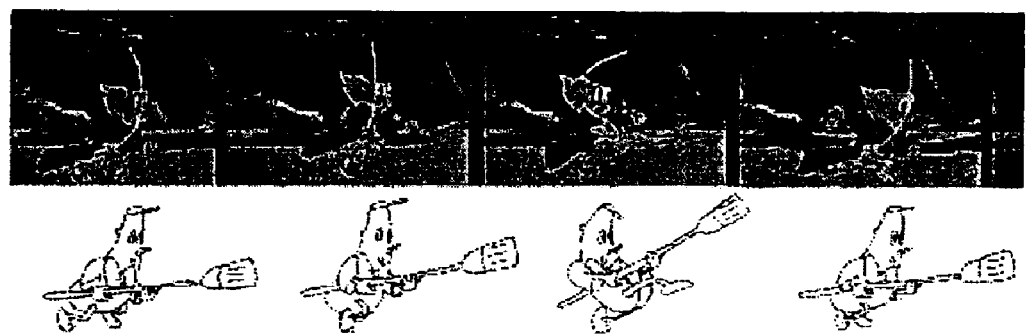
FIG. 14 is a schematic diagram graphically illustrating capturing line-of-action and retargeting to a 2D character according to the present invention.

A fourth example is provided of capturing only one contour, the line-of-action, as the source of the motion. The line-of-action is a very important principle in tradition animation. This motion captured from a cartoon character is retargeted onto a 2D character. Although there is not enough information in this contour to solve for more complex motion, such as how the legs move relative to each other, the essence of the motion is still present in the retargeted output as illustrated in FIG. 14.

Figure 15:
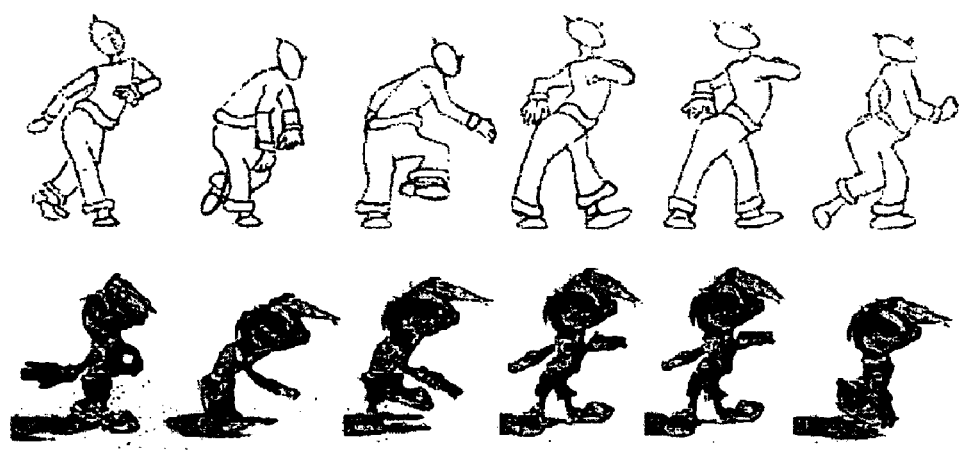
FIG. 15 is a schematic diagram graphically illustrating motion of walking cartoon character retargeted to 3D model according to the present invention.

A fifth example is provided where cartoon captured motion is retargeted onto 3D models. For this example a motion from a walking character in the first example is captured and retargeted to a 3D model of an otter. FIG. 11, illustrates some of the key poses of the walking character. FIG. 15 illustrates final rendered frames in the retargeted sequence of the otter.

Figure 16:
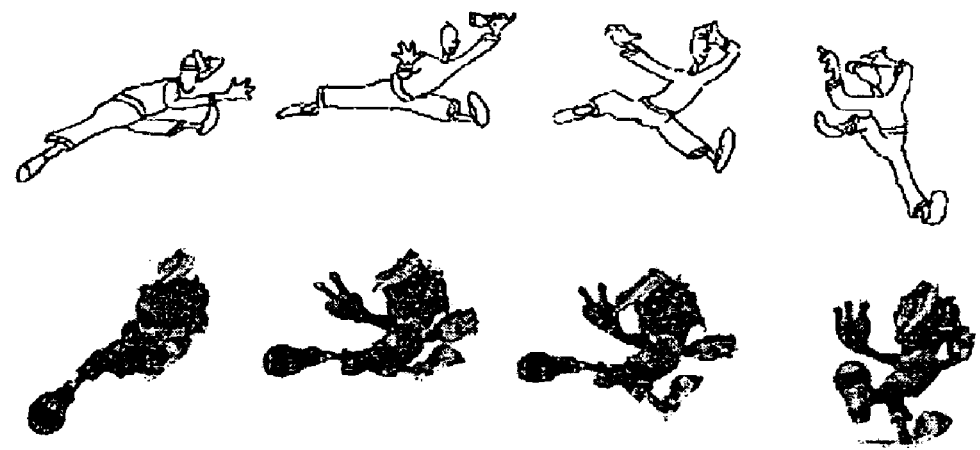
FIG. 16 is a schematic diagram graphically illustrating motion of jumping cartoon character retargeted to 3D model according to the present invention.

A sixth example is provided where a cartoon character jumping in a way that is impossible for an average human is captured, and retargeted onto the same 3D model. Again, contour capture is used to estimate the motion parameters. FIG. 16 illustrates some frames from the retargeted sequence of this example.

As is seen in each of the figures the motion style from the captured cartoon is successfully translated to the new image. The timing is preserved and the key-shapes from the original animation are mapped onto the new animation. The animations with the cartoon capture process were expressive and compelling. The personalities of the original cartoon characters were transferred to the target images.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A method of capturing motion of a first moving object in a cartoon and retargeting the motion of the first moving object to a second moving object, said method comprising the steps of:

inputting a digitized video of a cartoon having the first moving object;

permitting a user to select from the digitized video a plurality of key shapes of the first moving object as the first moving object moves in the digitized video;

wherein the selected key shapes each represents an extreme shape of the first moving object for which said user wishes to impart to the second moving object;

capturing motion of the first moving object as motion parameter data by performing a transform of the motion of the first moving object according to each of the key shapes;

wherein said motion parameter data includes timing parameter data representative of the timing of movements of the first moving object; and retargeting the motion of the first moving object to the second moving object by permitting said user to define for the selected key shapes of the first moving object corresponding key shapes of the second moving object to which the extreme shapes of the first moving object are to be imparted and mapping the motion parameter data including said timing parameter data onto the second moving object, thereby imparting a characteristic of the motion of the first moving object to the motion of the second moving object based on said motion parameter data.

2. A method according to claim 1, wherein capturing step comprises the step of:

generating the motion parameter data by performing an affine transform on the digitized video containing the first object.

3. A method according to claim 2, wherein the affine transform is performed according to each of the key shapes.

4. A method according to claim 1, wherein the motion parameter data includes timing parameter data representative of the timing of the movements of the first moving object.

5. A method according to claim 2, wherein the motion parameter data includes timing parameter data representative of the timing of the movements of the first moving object.

6. A method according to claim 3, wherein the motion parameter data includes timing parameter data representative of the timing of the movements of the first moving object.

7. A method according to claim 1, wherein said retargeting step comprises the step of:
  permitting the user to define for each input key-shape a corresponding output key-shape of the second moving object.

8. A method according to claim 7, wherein said retargeting step further comprises the step of:
  mapping the motion parameter data onto the output key-shapes of the second moving object.

9. An information processing apparatus for capturing motion of a first moving object in a cartoon and retargeting the motion of the first moving object to a second moving object, said information processing apparatus comprising:
  a video input unit for inputting a digitized video of a cartoon having the first moving object;
  an input unit for permitting a user to select from the digitized video a plurality of key shapes of the first moving object as the first moving moves in the digitized video;
  wherein the selected key shapes each represents an extreme shape of the first moving object for which said user wishes to impart to the second moving object; and
  a processing unit for capturing motion of the first moving object as motion parameter data by performing a transform of the motion of the first moving object according to each of the key shapes;
  wherein said motion parameter data includes timing parameter data representative of the timing of movements of the first moving object and
  retargeting the motion of the first moving object to the second moving object by permitting said user to define for the selected key shapes of the first moving object corresponding key shapes of the second moving object to which the extreme shapes of the first moving object are to be imparted and mapping the motion parameter data including said timing parameter data onto the second moving object, thereby imparting a characteristic of the motion of the first moving object to the motion of the second moving object based on said motion parameter data.

10. An information processing apparatus according to claim 9, wherein said processing unit generates the motion parameter data by performing an affine transform on the digitized video containing the first object.

11. An information processing apparatus according to claim 10, wherein the affine transform is performed according to each of the key shapes.

12. An information processing apparatus according to claim 9, wherein the motion parameter data includes timing parameter data representative of the timing of the movements of the first moving object.

13. An information processing apparatus according to claim 10, wherein the motion parameter data includes timing parameter data representative of the timing of the movements of the first moving object.

14. An information processing apparatus according to claim 11, wherein the motion parameter data includes timing parameter data representative of the timing of the movements of the first moving object.

15. An information processing apparatus according to claim 9, wherein said processing unit permits the user to define for each input key-shape a corresponding output key-shape of the second moving object.

16. An information processing apparatus according to claim 15, wherein said processing unit maps the motion parameter data onto the output key-shapes of the second moving object.

17. A computer program capturing motion of a first moving object in a cartoon and retargeting the motion of the first moving object to a second moving object, said computer program when executed causes an information processing apparatus to perform the steps of:
  inputting a digitized video of a cartoon having the first moving object;
  permitting a user to select from the digitized video a plurality of key shapes of the first moving object as the first moving object moves in the digitized video;
  wherein the selected key shapes each represents an extreme shape of the first moving object for which said user wishes to impart to the second moving object;
  capturing motion of the first moving object as motion parameter data by performing a transform of the motion of the first moving object according to each of the key shapes;
  wherein said motion parameter data includes timing parameter data representative of the timing of movements of the first moving object; and
  retargeting the motion of the first moving object to the second moving object by permitting said user to define for the selected key shapes of the first moving object corresponding key shapes of the second moving object to which the extreme shapes of the first moving object are to be imparted and mapping the motion parameter data including said timing parameter data onto the second moving object, thereby imparting a characteristic of the motion of the first moving object to the motion of the second moving object based on said motion parameter data.

18. A computer program according to claim 17, wherein capturing step when executed by said information processing apparatus performs the step of:
  generating the motion parameter data by performing an affine transform on the digitized video containing the first object.

19. A computer program according to claim 18, wherein the affine transform is performed according to each of the key shapes.

20. A computer program according to claim 17, wherein the motion parameter data includes timing parameter data representative of the timing of the movements of the first moving object.

21. A computer program according to claim 18, wherein the motion parameter data includes timing parameter data representative of the timing of the movements of the first moving object.

22. A computer program according to claim 19, wherein the motion parameter data includes timing parameter data representative of the timing of the movements of the first moving object.

23. A computer program according to claim 17, wherein said retargeting step when executed by said information processing apparatus performs the step of:
  permitting the user to define for each input key-shape a corresponding output key-shape of the second moving object.

24. A computer program according to claim 23, wherein said retargeting step when executed by said information processing apparatus performs the step of:
  mapping the motion parameter data onto the output key-shapes of the second moving object.

* * * * *

UNITED STATES PATENT AND TRADEMARK OFFICE
CERTIFICATE OF CORRECTION

| | | |
|---|---|---|
| PATENT NO. | : 6,888,549 B2 | Page 1 of 1 |
| APPLICATION NO. | : 10/101698 | |
| DATED | : May 3, 2005 | |
| INVENTOR(S) | : Christopher Bregler | |

It is certified that error appears in the above-identified patent and that said Letters Patent is hereby corrected as shown below:

Column 1, line 12 please insert:

This invention was made with Government support under contract 9988505 awarded by the National Science Foundation. The Government has certain rights in this invention.

Signed and Sealed this

Sixth Day of March, 2007

JON W. DUDAS
*Director of the United States Patent and Trademark Office*